(12) United States Patent
Fuchikami

(10) Patent No.: US 10,656,506 B2
(45) Date of Patent: May 19, 2020

(54) HIGH-SPEED DISPLAY DEVICE, HIGH-SPEED DISPLAY METHOD, AND REALTIME MEASUREMENT-PROJECTION DEVICE

(71) Applicant: PANASONIC INTELLECTUAL PROPERTY MANAGEMENT CO., LTD., Osaka (JP)

(72) Inventor: Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 186 days.

(21) Appl. No.: 16/064,093

(22) PCT Filed: Dec. 20, 2016

(86) PCT No.: PCT/JP2016/005190
§ 371 (c)(1),
(2) Date: Jun. 20, 2018

(87) PCT Pub. No.: WO2017/110086
PCT Pub. Date: Jun. 29, 2017

(65) Prior Publication Data
US 2019/0004406 A1 Jan. 3, 2019

(30) Foreign Application Priority Data

Dec. 24, 2015 (JP) .................................. 2015-252608

(51) Int. Cl.
*G03B 21/14* (2006.01)
*G09G 3/34* (2006.01)
(Continued)

(52) U.S. Cl.
CPC .......... *G03B 21/142* (2013.01); *G03B 21/00* (2013.01); *G03B 21/14* (2013.01); *G09G 3/20* (2013.01);
(Continued)

(58) Field of Classification Search
CPC .. G03B 21/005; G03B 21/006; G03B 21/008; G03B 21/14; G03B 21/00; G03B 21/142;
(Continued)

(56) References Cited

U.S. PATENT DOCUMENTS 6,697,084 B1 2/2004 Ohmae et al.
6,738,054 B1 5/2004 Yamaguchi
(Continued)

FOREIGN PATENT DOCUMENTS

| JP | 2000-206937 | 7/2000 |
|----|-------------|--------|
| JP | 2002-281530 | 9/2002 |

(Continued)

OTHER PUBLICATIONS

International Search Report (ISR) from International Searching Authority (Japan Patent Office) in International Pat. Appl. No. PCT/JP2016/005190, dated Mar. 21, 2017.
(Continued)

*Primary Examiner* — William C. Dowling
(74) *Attorney, Agent, or Firm* — Greenblum & Bernstein, P.L.C.

(57) ABSTRACT

A high-speed display device inputs first video information having a first frame rate and a gradation of first number of bits, generates a set of M (integer of 2 or more) variation gradation values having a second number of bits smaller than the first number of bits and having a sum corresponding to the respective gradation values of the gradations of the
(Continued)

first number of bits, and distributes the values from the set of the M variation gradation values corresponding to the respective gradation values of the first video information obtained from a variation gradation value output to the corresponding M frames for each frame of the first video information to generate second video information having a second frame rate that is M times the first frame rate and display video based on the second video information.

8 Claims, 12 Drawing Sheets

(51) Int. Cl.
<table>
<tr><td>H04N 5/74</td><td>(2006.01)</td></tr>
<tr><td>H04N 9/31</td><td>(2006.01)</td></tr>
<tr><td>G09G 3/20</td><td>(2006.01)</td></tr>
<tr><td>H04N 7/01</td><td>(2006.01)</td></tr>
<tr><td>G03B 21/00</td><td>(2006.01)</td></tr>
<tr><td>H04N 5/66</td><td>(2006.01)</td></tr>
</table>

(52) U.S. Cl.
CPC .............. *G09G 3/34* (2013.01); *H04N 5/66* (2013.01); *H04N 5/74* (2013.01); *H04N 7/0127* (2013.01); *H04N 9/3185* (2013.01); *H04N 9/3188* (2013.01); *H04N 9/3194* (2013.01)

(58) Field of Classification Search
CPC .......... H04N 5/74; H04N 5/7416; H04N 5/66; H04N 9/31; H04N 9/3102; H04N 9/3108; H04N 9/3194; H04N 9/3185; H04N 9/3188; H04N 7/0127; G09G 3/20; G09G 3/34
See application file for complete search history.

(56) References Cited

U.S. PATENT DOCUMENTS

<table>
<tr><td>2002/0163576 A1</td><td>11/2002</td><td>Ishino et al.</td><td></td></tr>
<tr><td>2003/0202000 A1*</td><td>10/2003</td><td>Kudo</td><td>G09G 3/2051<br>345/690</td></tr>
<tr><td>2004/0046726 A1</td><td>3/2004</td><td>Sako et al.</td><td></td></tr>
<tr><td>2008/0170021 A1</td><td>7/2008</td><td>Chen</td><td></td></tr>
<tr><td>2009/0295842 A1*</td><td>12/2009</td><td>Okada</td><td>G09G 3/3406<br>345/690</td></tr>
<tr><td>2012/0249619 A1*</td><td>10/2012</td><td>Furukawa</td><td>G09G 3/3648<br>345/691</td></tr>
<tr><td>2013/0176485 A1</td><td>7/2013</td><td>Aiba</td><td></td></tr>
<tr><td>2016/0088275 A1</td><td>3/2016</td><td>Fuchikami</td><td></td></tr>
<tr><td>2020/0021785 A1*</td><td>1/2020</td><td>Mima</td><td>H04N 7/0127</td></tr>
</table>

FOREIGN PATENT DOCUMENTS

<table>
<tr><td>JP</td><td>2003-279930</td><td>10/2003</td></tr>
<tr><td>JP</td><td>2004-062116</td><td>2/2004</td></tr>
<tr><td>JP</td><td>4008178</td><td>9/2007</td></tr>
<tr><td>JP</td><td>2010-085515 A</td><td>4/2010</td></tr>
<tr><td>JP</td><td>2012-042788</td><td>3/2012</td></tr>
<tr><td>JP</td><td>2015-173431 A</td><td>10/2015</td></tr>
<tr><td>WO</td><td>2015/125403</td><td>8/2015</td></tr>
</table>

OTHER PUBLICATIONS

The Extended European Search Report from the European Patent Office (EPO) dated Sep. 19, 2019 for the related European Patent Application No. 16877990.8.

The partial supplementary European search report (R.164 EPC) from the European Patent Office (EPO) dated Apr. 18, 2019 for the related European Patent Application No. 16877990.8.

Seung-Woo Lee et al: "55.5L: Late-News Paper: A Novel Dithering Algorithm for High Color Depth and High Color Performance: Hi-FRC", 2004 SID International Symposium. Seattle, WA, May 25-27, 20; [SID International Symposium], San Jose, CA : SID, US, vol. XXXV, May 25, 2004 (May 25, 2004), pp. 1482-1485, XP007011999.

* cited by examiner

HIGH-SPEED DISPLAY DEVICE, HIGH-SPEED DISPLAY METHOD, AND REALTIME MEASUREMENT-PROJECTION DEVICE

TECHNICAL FIELD

The present disclosure relates to a device and method for displaying moving images at a high speed and with a high gradation, and a real time measurement-projection device using the device.

BACKGROUND ART

A moving image gives the impression that an object moves continuously as a series of still images are displayed at a speed of 24 fps or 60 fps. In a case where a viewer sees a moving image without moving the line of sight, there is no sense of discomfort in many cases. However, as in the attraction of a 360-degree field of view and the projection mapping for the moving object, in a case where the line of sight of the viewer follows the projected image moving at a high speed, or a moving image is projected on an object moving at a high speed, it is known that a sense of discomfort such as feeling the movement of the image intermittently may occur.

Therefore, by using a high-speed projection element such as a digital micromirror device (DMD), for example, it is conceivable to project a moving image at a speed (frame rate) of 1,000 fps. However, if the image is to be displayed in full color (24-bit color), the response speed of the DMD is also insufficient, and the amount of computation required for image rendering becomes enormous, which makes it difficult to handle with Codec or GPU of the related art. In addition, a video transmission standard such as HDMI (registered trademark) is also not suitable for transmission of such a large amount of data.

In PTL1, it is assumed that each pixel of moving image is composed of a plurality of segments divided in time and each segment is composed of a plurality of subfields, weighting is applied to luminance in each subfield, and a technique for obtaining a desired intermediate gradation depending on which subfield is to be combined for each pixel is described. However, a relatively large number of segments are set in order to achieve a high gradation, and the required computation and transmission processing are to be performed in a short time, and if a moving image is to be projected or displayed at a high frame rate, it is difficult to achieve a sufficiently high gradation in a commercially available device.

In the field of projection mapping for moving objects, which is under development in recent years, a device that performs high-speed display at 1000 fps while measuring with Ir pattern light by combining a digital micromirror device (DMD) and a high-speed camera is used. In this case, it is necessary to perform the display pattern control at a high speed, and for example, it is possible to create a gradation of video by turning ON/OFF the mirror of the DMD in a time division manner. However, in the case of performing video projection while inserting Ir pattern light therebetween, since it is necessary to update the entire screen area, even with the speed of the DMD, the number of gradations that may be configured in $\frac{1}{1000}$ second is small. For example, when three colors of RGB are used and the gradation is displayed by 4 bits, the gradation becomes insufficient because the colors become 12-bit color. In addition, even when Ir pattern light is not inserted, in a case where a moving image of a high frame rate is to be played on a moving object, it is still necessary to update the entire screen at the frame boundary, so the number of gradations that may be configured in $\frac{1}{1000}$ second decreases.

The present disclosure aims to play a moving image at a high speed and with a high gradation under the constraints imposed by display devices such as DMD or transmission and processing devices.

CITATION LIST

Patent Literature

PTL 1: Japanese Patent No. 4008178

SUMMARY OF THE INVENTION

A high-speed display device of the present disclosure includes a video information input that inputs first video information expressed by original gradation values having a first number of bits at a first frame rate, a variation gradation value output that generates a set including M (integer of 2 or more) variation gradation values having a second number of bits smaller than the first number of bits corresponding to the respective original gradation values, a video information output that generates second video information having a second frame rate equal to M times the first frame rate by distributing the respective variation gradation values included in the set of M variation gradation values to M frames, and a display that displays video based on the second video information, in which the sum of the M variation gradation values and the gradation values of the first number of bits have a correlation in each set of the variation gradation values.

According to the present disclosure, as video of a high gradation is expressed by changing the gradation values of a low gradation in time as variation gradation values distributed to a plurality of frames, for example, the video of a high frame rate in which display contents are changed according to a moving object may be displayed as if the contents were in a high gradation for a person who watches while following the movement despite the fact that the contents are video data of a low gradation. Therefore, at the time of transmission, video of a low frame rate (the first frame rate) and a high gradation (gradation having the first number of bits) is converted into video of a high frame rate (the second frame rate) and a low gradation (the second number of bits), but the contents are viewed as video of a high gradation for the viewer that follows the object moving at a high speed (high frame rate).

According to one aspect of the present disclosure, the variation gradation value in each set of variation gradation values is displayed in such an order that increase/decrease appears at least once as much as possible. In addition, the second video information is generated by distributing the respective variation gradation values included in the set of the M variation gradation values to the M frames in such an order that the number of times of increase/decrease between the variation gradation values in each set of the variation gradation values is maximum.

In this way, the increase and decrease of the variation gradation value are smoothed in time, and it is possible to suppress the occurrence of a sense of discomfort.

According to another aspect of the present disclosure, the variation gradation value output includes a variation value output that outputs a variation value consisting of integer values from 0 to M−1, a variation value adder that calculates a sum by adding each gradation value to each variation value, and an image color reducer that divides the sum by the variation value M and truncates the decimals of the obtained quotient. In addition, the variation gradation value output includes a variation value output that outputs a variation value having any value N from 0 to M−1 corresponding to a (N+1)th variation gradation value when generating the set of the M variation gradation values corresponding to the respective original gradation values, and an image color reducer that generates the (N+1)th variation gradation value by dividing the sum of the original gradation value and variation value N by number M of the variation values constituting the set of variation values corresponding to variation value N and truncating the decimals of the obtained quotient.

According to this, it is possible to easily calculate a variation gradation value with relatively small variation.

A high-speed display method of the present disclosure includes a step of inputting first video information having a first frame rate and a gradation of first number of bits, a step of generating a set of M (integer of 2 or more) variation gradation values having a second number of bits smaller than the first number of bits and having a sum corresponding to the respective gradation values of the gradations of the first number of bits, a step of generating second video information having a second frame rate equal to M times the first frame rate by distributing the values from the set of the M variation gradation values corresponding to the respective gradation values of the first video information to the corresponding M frames for each frame of the first video information, and a step of displaying video based on the second video information.

In addition, the high-speed display method of the present disclosure includes a step of inputting first video information expressed by original gradation values having a first number of bits at a first frame rate, a step of generating a set including M (integer of 2 or more) variation gradation values having a second number of bits smaller than the first number of bits corresponding to the respective original gradation values, a step of generating second video information having a second frame rate equal to M times the first frame rate by distributing the respective variation gradation values included in the set of the M variation gradation values to M frames, and a step of displaying video based on the second video information, in which the sum of the M variation gradation values and the gradation values of the first number of bits have a correlation in each set of the variation gradation values.

The real time measurement-projection device of the present disclosure includes a video information input to which first video information composed of a content image having a first frame rate and gradations of a first number of bits is input, a variation gradation value output that generates a set of M variation gradation values having a second number of bits smaller than the first number of bits and having a sum corresponding to the respective gradation values of the gradations of the first number of bits, a video information processor that distributes the values from the set of the M variation gradation values corresponding to the respective gradation values of the first video information obtained from a variation gradation value output to the corresponding M frames for each frame of the first video information to generate second video information having a second frame rate that is M times the first frame rate, a measurement pattern generator that generates a measurement pattern, a video output that alternately outputs the second video information and the measurement pattern, a projection device for projecting the output of the video output to a projection target, an imaging device that takes video of the measurement pattern projected on the projection target, and a position calculation device for correcting the second video information based on a position of the projection target obtained by comparing the video of the measurement pattern obtained by the imaging device with an original measurement pattern.

In addition, the real time measurement-projection device of the present disclosure includes a video information input that inputs first video information expressed by original gradation values having a first number of bits at a first frame rate, a variation gradation value output that generates a set including M (integer of 2 or more) variation gradation values having a second number of bits smaller than the first number of bits corresponding to the respective original gradation values, a video information processor that generates second video information having a second frame rate equal to M times the first frame rate by distributing the respective variation gradation values included in the set of the M variation gradation values to M frames, a measurement pattern generator that generates a measurement pattern, a video output that alternately outputs the second video information and the measurement pattern, a projection device for projecting the output of the video output to a projection target, an imaging device that takes video of the measurement pattern projected on the projection target, and a position calculation device for correcting the second video information based on a position of the projection target obtained by comparing the video of the measurement pattern obtained by the imaging device with an original measurement pattern, in which the sum of the M variation gradation values and the gradation values of the first number of bits have a correlation in each set of the variation gradation values.

As a result, it is possible to cope with a change in the position or the shape of a projection target at a high speed, and it is possible to realize a high frame rate. In particular, even in a case where the viewer's line of sight follows a projected image moving at a high-speed or a moving image is projected on an object moving at a high speed, it is possible to project a high-quality image without giving the viewer a sense of discomfort such as feeling the movement of the image intermittently.

According to a preferred example of the present disclosure, both the imaging time of the measurement pattern by the imaging device and the projection time of the second video information are shorter than the time the imaging device reads the video of the measurement pattern and transfers the video to the position calculation device, and the imaging of the measurement pattern by the imaging device is started prior to the completion of projection of preceding second video information.

In general, the cost of the imaging device increases as the transfer rate of the imaging result decreases, but by using this technique, it is possible to realize the maximum frame rate while measuring the projection target in a timely manner without increasing the cost of the imaging device.

According to the present disclosure, it is possible to provide a high-speed display method and device for performing moving image play at a high speed and with a high gradation under the constraints of transmission and processing device limitations, and a real time measurement-projection device using the same device.

DESCRIPTION OF EMBODIMENT

Figure 1:
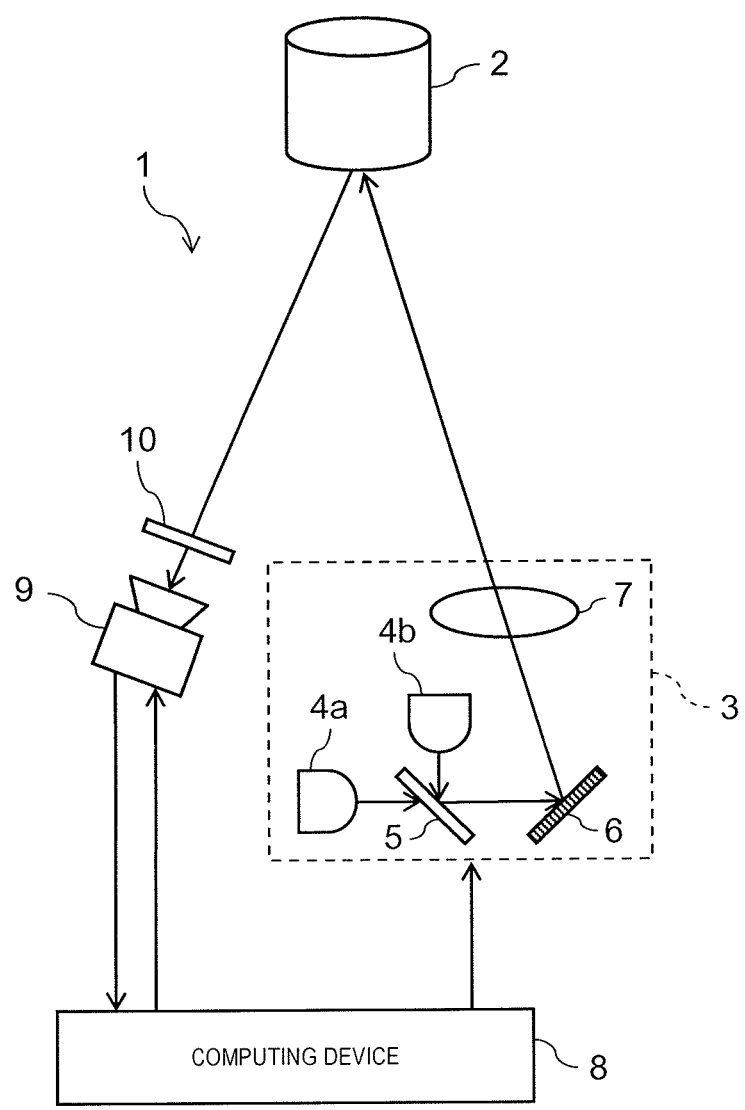
FIG. 1 is a diagram showing one embodiment of a real time measurement-projection device.

FIG. 1 is a diagram showing one embodiment of a real time measurement-projection device. In real time measurement-projection device 1 shown in FIG. 1, projection device 3 includes visible light LED light source 4a and infrared LED light source 4b, and these emitted light beams are merged by dichroic mirror 5 and input to digital micromirror device (DMD) 6. The light emitted from the DMD 6 is projected onto projection target 2 via lens optical system 7. Computing device 8 may modulate the light from the light source on a desired side, if necessary, and irradiate the modulated light to a predetermined point on projection target 2 by selectively exciting visible light LED light source 4a and infrared LED light source 4b and by supplying a control signal to DMD 6. As a result, it is possible to project a two-dimensional image in pixel units to projection target 2, project a number of two-dimensional images chronologically as desired, and provide the images as a moving image.

In particular, this real time measurement-projection device 1 is configured to obtain the distance information of the moving and/or changing projection target 2 so that a person viewing the image projected by projection device 3 may watch without distortion regardless of the change of projection target 2 based on the obtained distance information. For this purpose, camera 9 is provided for projecting a predetermined measurement pattern on projection target 2 by invisible light (invisible electromagnetic wave) such as infrared rays and the like by projection device 3 and acquiring the projection image. The image of the measurement pattern obtained by camera 9 is processed by computing device 8 to calculate the distance information of projection target 2. Based on the calculated distance information, projection device 3 corrects required video contents, that is, converts coordinates, and projects the coordinate-converted image onto projection target 2 with visible light. As a result, the viewer may watch the video contents without distortion regardless of the three-dimensional shape of projection target 2. Visible light cut filter 10 is provided in front of camera 9 in order to eliminate the possibility that the visible light for projecting the video contents obstructs acquisition of distance information by infrared rays or the like.

Figure 2:
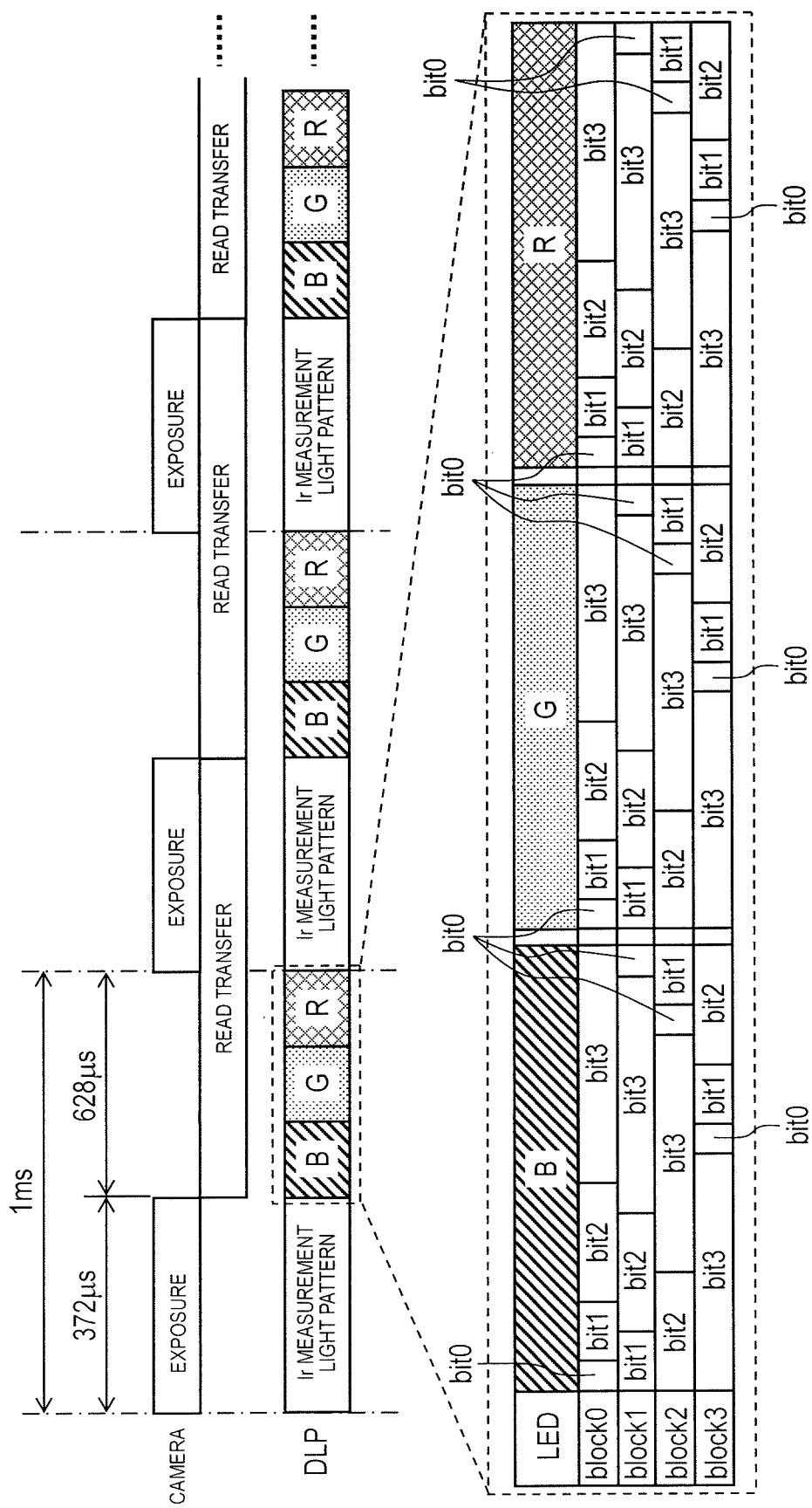
FIG. 2 is a time chart showing an example of display pattern control related to distance measurement and projection processing in the real time measurement-projection device.

FIG. 2 is a time chart showing an example of display pattern control related to distance measurement and projection processing in real time measurement-projection device 1. The processing in this case is performed with a processing cycle of about 1 ms (960 fps). During a first 372 μs, Ir light for measurement is projected onto the object, and during the following 1 ms, the reflected light from the object for measurement is read out and transferred. Based on the obtained data, information on the three-dimensional shape of the object is calculated, necessary coordinate transformation is applied to the original image of the content image to be projected next, and the final image to be projected is calculated.

In each processing cycle, at the same time as the projection of Ir light is completed, a latest final image (content image) is projected onto the object during 628 μs. Normally, the frame rate of the camera is limited by read transfer time, but by making exposure time shorter than the read transfer time, it is possible to secure RGB display time without lowering the frame rate. This means that the exposure adjustment range of the camera is restricted by the securing of RGB display time, but it is possible to increase the display frame rate without changing the read transfer time which determines the cost of the camera and maximize the frame rate while timely measuring the projection target by maximizing the limit of the capabilities of the transmission and processing device.

At this time, each of the three RGB colors is projected sequentially, but the gradation of the image of each color is displayed by four segments constituted by four subfields respectively, that is, is displayed with 4-bit gradation. Therefore, since three colors of RGB are used, the image is in a 12-bit color, and the quality of the image is inferior to that of a general full color (24-bit color).

Figure 3:
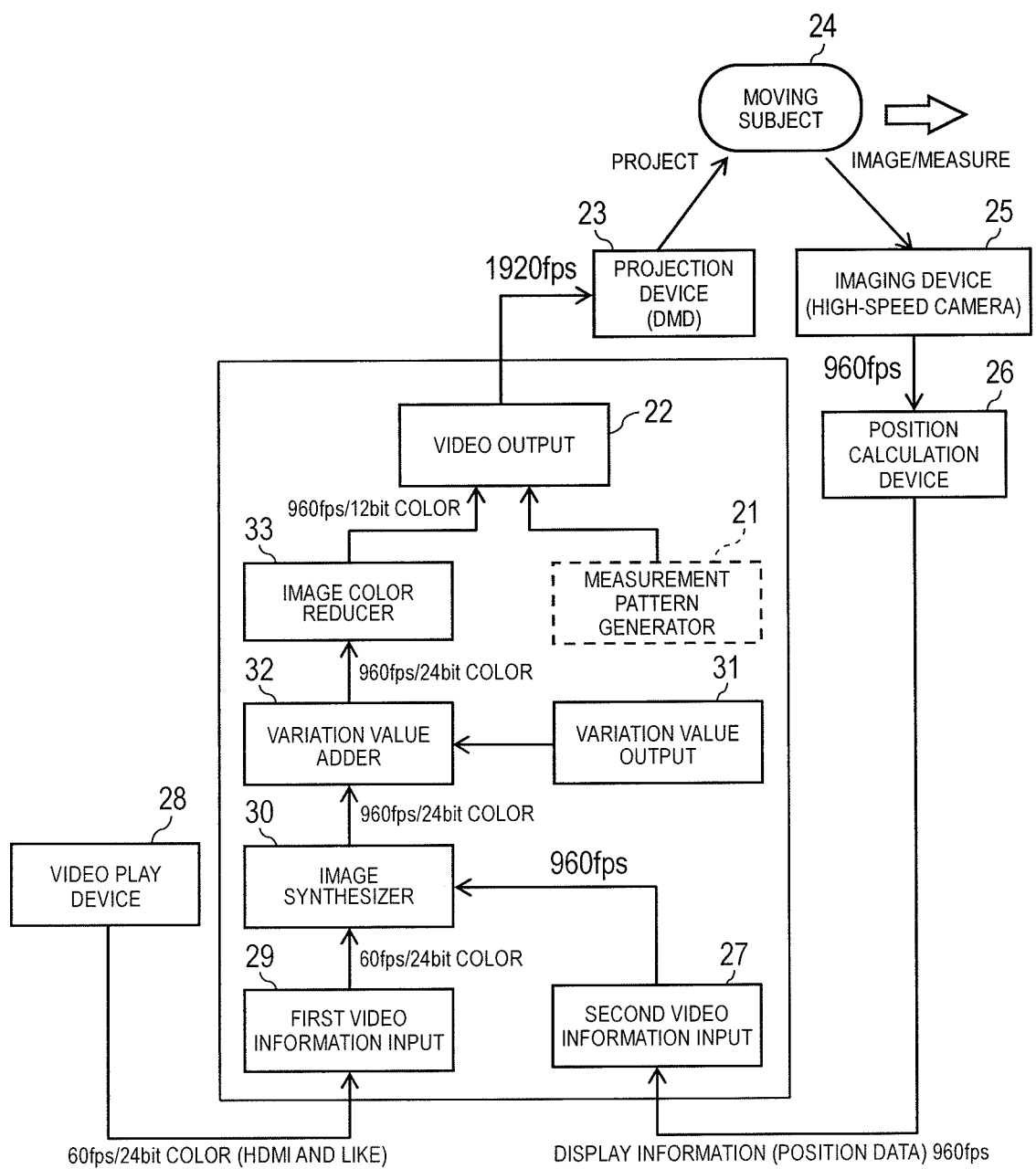
FIG. 3 is a block diagram showing a configuration of the real time measurement-projection device.
Figure 4:
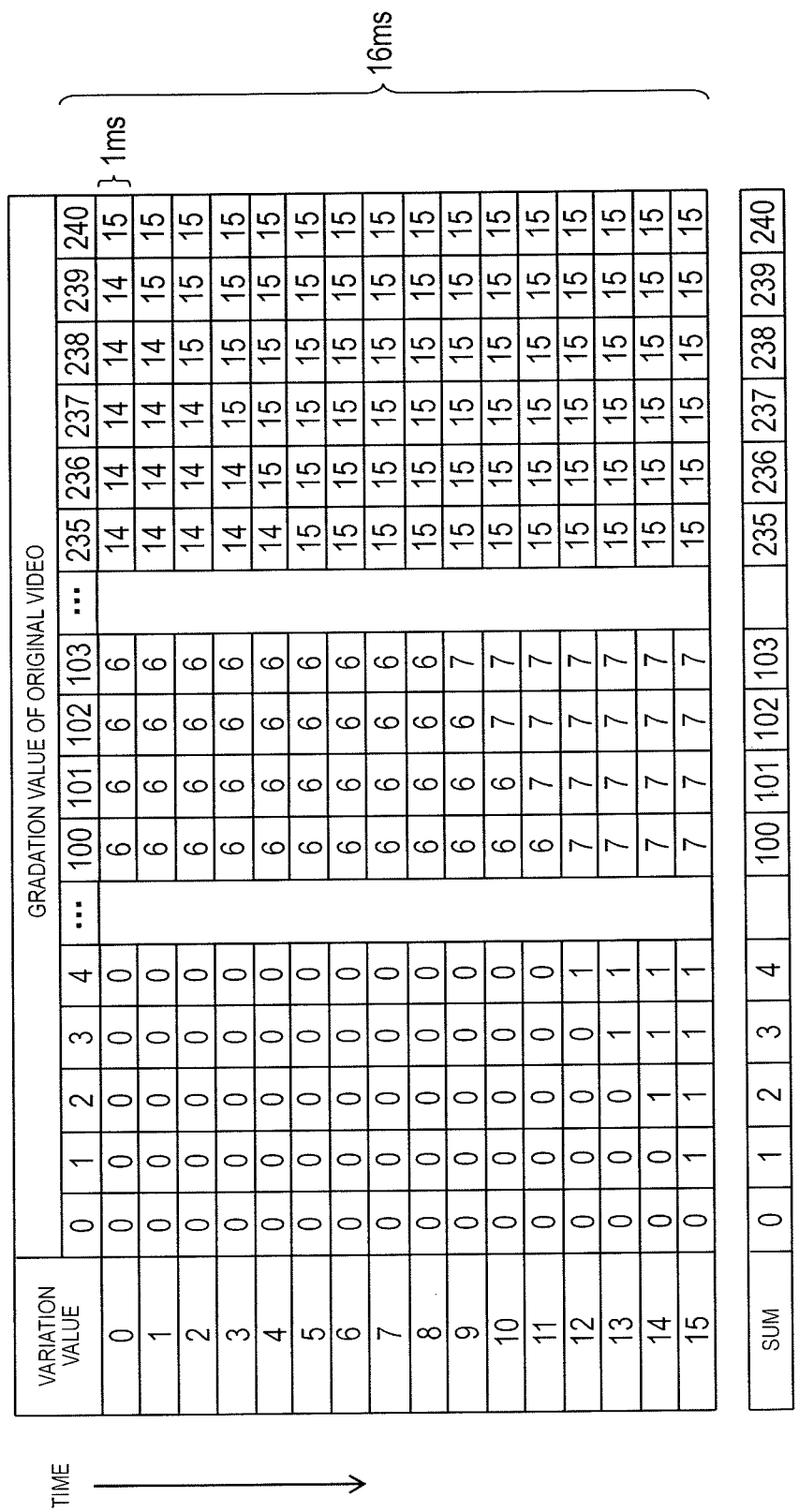
FIG. 4 is a diagram showing a correspondence relationship between a set of gradation values (variation gradation values) of 4-bit gradation corresponding to gradation values of 8-bit gradation from 0 to 240.

Hence, higher gradation may be expressed by performing time division processing in the following manner, and the configuration thereof will be described below with reference to FIGS. 3 and 4. FIG. 3 is a block diagram showing a configuration of the real time measurement-projection device. FIG. 4 is a table showing a correspondence relationship between a set of gradation values (variation gradation values) of 4-bit gradation corresponding to gradation values of 8-bit gradation from 0 to 240. As shown in FIG. 3, the measurement pattern generated by measurement pattern generator 21 is projected onto object 24 by projection device 23 via video output 22. The projected image is taken by imaging device 25 constituted by a high-speed camera, and the three-dimensional position at each point of the projected image is calculated by position calculation device 26. The display information composed of the position data is supplied to second video information input 27. At this time, the display information is generated at a frame rate of 960 fps.

On the other hand, the video composed of the content image is played by video play device 28, and this video is composed of a 24-bit color and played at a frame rate of 60 fps. For this transmission, it is possible to use a conventional system such as the HDMI (registered trademark) system. The video composed of this content image is sent to image synthesizer 30 via first video information input 29, synthesized with the information from second video information input 27, and converted into video suitable for projection onto the object. At this point, video is composed of 24-bit color video and is transmitted at a frame rate of 960 fps. Since the transmission and projection processing is difficult as it is, color reduction processing is performed as follows.

Video is reduced to video of 4-bit gradation for each color. At this time, as shown in FIG. 4, the video data of 8-bit gradation (original gradation values having a first number of bits) set from 0 to 240 is converted into video data of 4-bit gradation (variation gradation values having a second number of bits smaller than the first number of bits) composed of 0 to 15 gradation values. At this time, 16 kinds (4 bit) of conversion rules represented by M=16 variation values 0 to 15 are set. That is, in variation value 0, gradation value (variation gradation value) 15 of 4-bit gradation is assigned to gradation value (original gradation value) 240 of 8-bit gradation, gradation value 14 of 4-bit gradation is assigned to gradation value 239 of 8-bit gradation, and thereafter, every time the gradation values of 8-bit gradation are decreased by 16, the gradation values of 4-bit gradation are decreased by 1. For example, gradation value 0 of 4-bit gradation is assigned to gradation values 0 to 15 of 8-bit gradation. Based on such a rule, the gradation values of the assigned 8-bit gradation are converted into 16 4-bit gradation values based on 16 conversion rules expressed by the variation values between 0 and 15.

Here, the gradation value of 8-bit gradation is called "original gradation value" and the gradation value of 4-bit gradation is called "variation gradation value". In each set of the variation gradation values of 4-bit gradation which is the second number of bits, the sum of the M=16 variation gradation values and the original gradation values having 8-bit gradation which is the first number of bits have a correlation. For example, in the variation gradation value set corresponding to gradation value 101 of the original video shown in FIG. 4, variation gradation value 6 is assigned to eleven variation values 0 to 10 out of the M=16 variation values, respectively, and the variation gradation value 7 is assigned to the remaining five variation values 11 to 16, respectively. The sum of these 16 variation gradation values is 6×11+7×5=66+35=101, which is equal to gradation value 101 of the original video and has a correlation. Such a relationship is similar between the other gradation values of the original video and the sum of the M=16 variation gradation values corresponding thereto.

In the example shown in FIG. 4, the gradation values of the original video and the sum of the M=16 variation gradation values corresponding thereto have a relationship of being equal, but in the present invention, the relationship does not need to be absolutely equal, and it is only necessary that there is a correlation with the magnitude of the values. That is, either the gradation values of the original video or the sum of the M=16 variation gradation values corresponding thereto may be increased with a certain difference or ratio. The set of 16 gradation values of 4-bit gradation is distributed to M=16 frames of video information from second video information input 27 corresponding to individual frames of video information composed of content images.

In other words, in the case of outputting, for example, original gradation value 101 in a certain frame, variation gradation value 6 is output 11 times and variation gradation value 7 is output 5 times. That is, 101=6×11+7×5, and by varying the variation gradation value as necessary within M=16 frames despite outputting 4-bit gradation, it is possible to make the 4-bit gradation appear as though 8-bit gradation was displayed. Incidentally, in FIG. 4, number M constituting the set of the variation gradation values is 16, but in the present invention, the number is not limited to M=16, and other values may be used.

The variation gradation values may be calculated as follows. For each of the original gradation values, it is possible to calculate a variation gradation value for the variation value by adding each variation value, dividing the value by the number M=16 of variation values constituting the set of variation values, and truncating the remainder. For example, by adding variation value N=2 to original gradation value 101, 103 is obtained, by dividing the obtained value by number M=16 of variation values constituting the set of variation values, 6.43 (=(101+2)/16) is obtained, and (N+1=3)th variation gradation value 6 is obtained by truncating the decimal point. This calculation is performed for all variation values. In other words, when a set of the M=16 variation gradation values corresponding to the respective original gradation values are generated, a variation value having any value N from 0 to M−1 is output to corresponding to a (N+1)th variation gradation value, and the sum of the original gradation value and variation value N is divided by number M of the variation values constituting the set of the variation values corresponding to variation value N, the (N+1)th variation gradation value is generated by truncating the decimals of the quotient obtained as a result. In the present embodiment, variation value N uses an integer, but variation value N of the present invention is not limited to an integer and may be in a decimal point format, for example.

In the present example, final display is performed at a frame rate of 16 (the fourth power of 2) times of the content video, and the gradation value is reduced to $\frac{1}{16}$ (the fourth power of 2). However, in general, final display may be performed at a frame rate of the N (integer of 1 or more)-th power of 2, and the gradation value may be reduced to 1/the N-th power of 2. Alternatively, to further generalize, display is performed at a frame rate of intermediate value M (integer of 2 or more) that is a power of 2, the gradation value may also be reduced to $\frac{1}{16}$ (2 to the power of 4).

As shown in the block diagram of FIG. 3, the variation value sequentially supplied from variation value output 31 is added to the original gradation value by variation value adder 32, image color reducer 33 divides the value by 16, and the decimals of the obtained quotient are truncated, moving image data of 960 fps may be obtained with 12-bit color (4-bit gradation). The video data obtained in this way is supplied to projection device 23 via video output 22. At this time, since the measurement light is projected so as to alternate with the frame of the content image, video data of 1,920 fps is supplied to projection device 23.

Figure 5:
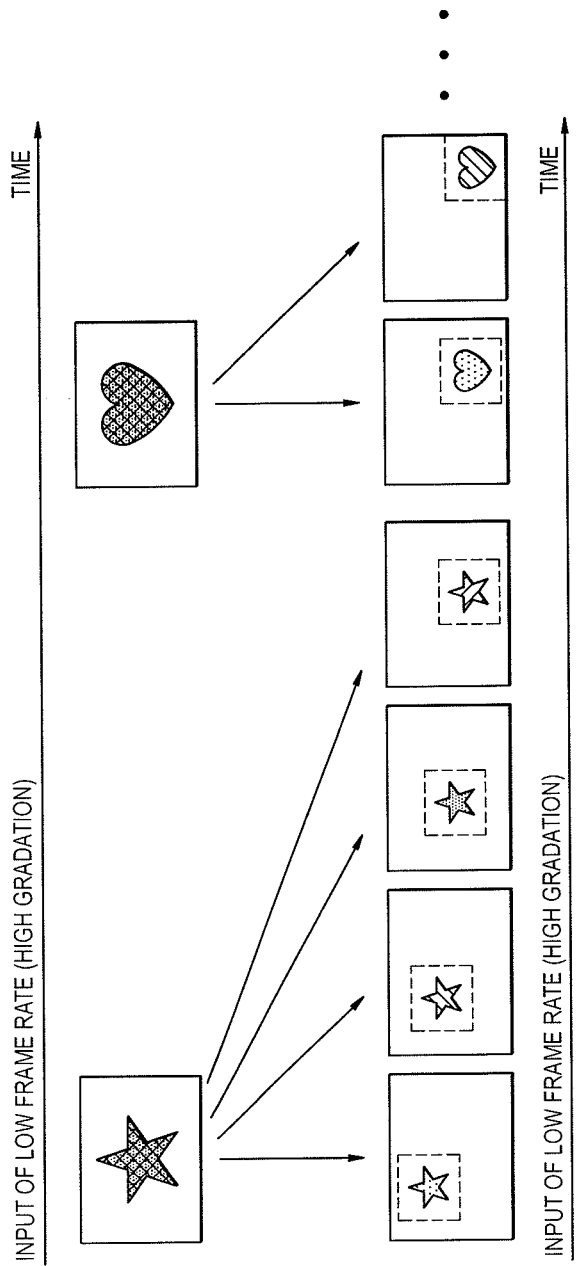
FIG. 5 is a diagram schematically showing a manner of converting video data of a low frame rate and a high gradation into video data of a high frame rate and a low gradation.

FIG. 5 is a diagram schematically showing a manner of converting video data of a low frame rate and a high gradation into video data of a high frame rate and a low gradation. The image projected on the moving object changes from a star shape to a heart shape. At a low frame rate, the image is represented by 24-bit color video, but at a high frame rate, by synthesizing a plurality of 12-bit color video in time, high-gradation video equivalent to 24-bit color video is visually played. As a result, even in a case where the object to be projected moves irregularly and at a high speed, it is possible to project video of a high gradation that does not cause a sense of discomfort.

Figure 6:
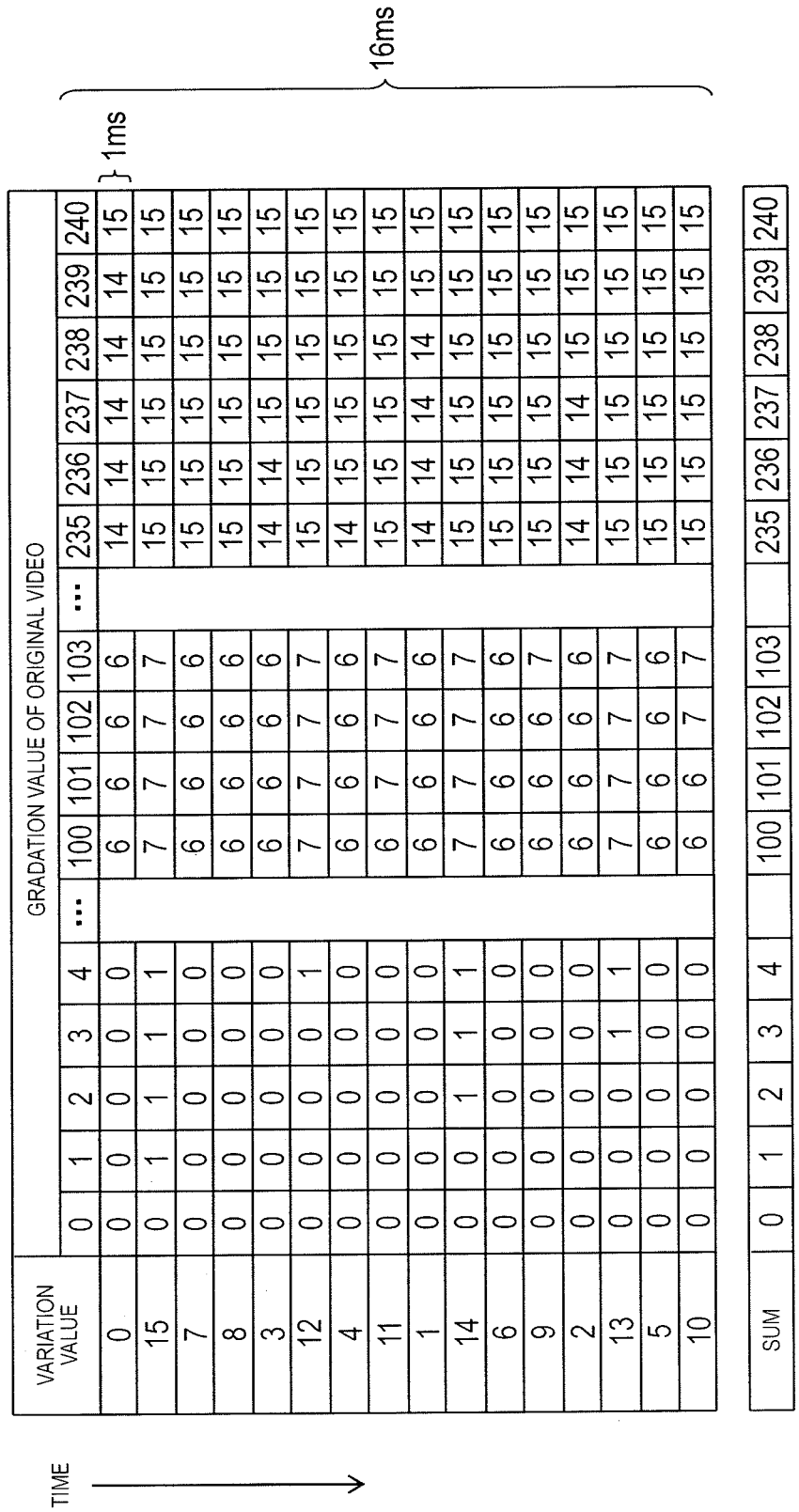
FIG. 6 is another example of a diagram showing a correspondence relationship between a set of gradation values (variation gradation values) of 4-bit gradation corresponding to gradation values of 8-bit gradation from 0 to 240.

FIG. 6 is another example of a table showing a correspondence relationship between a set of gradation values (variation gradation values) of 4-bit gradation corresponding to gradation values of 8-bit gradation from 0 to 240. In the example described above, the variation values are shown to be output in ascending order of magnitude, but in the present example, the variation values appear in an irregular order. The order of appearance may be a random order that varies every time, but may appear in a constant irregular order. In any case, since there is a possibility that a change in the gradation values suddenly occurs, it is only necessary that the variation gradation values are not at least monotonically increasing or monotonically decreasing, for example, it is preferable that the appearance order is such that increase or decrease appears at least once. In addition, the respective variation gradation values included in the set of the M variation gradation values may be distributed to the M frames in such an order that the number of times of increase/decrease between the variation gradation values in each set of the variation gradation values is maximum. In this way, the gradation values are averaged in time, and therefore it is unlikely to cause a sense of discomfort.

Further, in order to obtain the variation gradation values from the respective original gradation values, instead of performing the subtractive color calculation as described above, as shown in FIG. 4 or 6, it is also possible to prepare a lookup table in which 16 variation gradation values corresponding to the respective original gradation values are arranged and to extract a set of variation gradation values corresponding to the respective original gradation values based the table.

Figure 7:
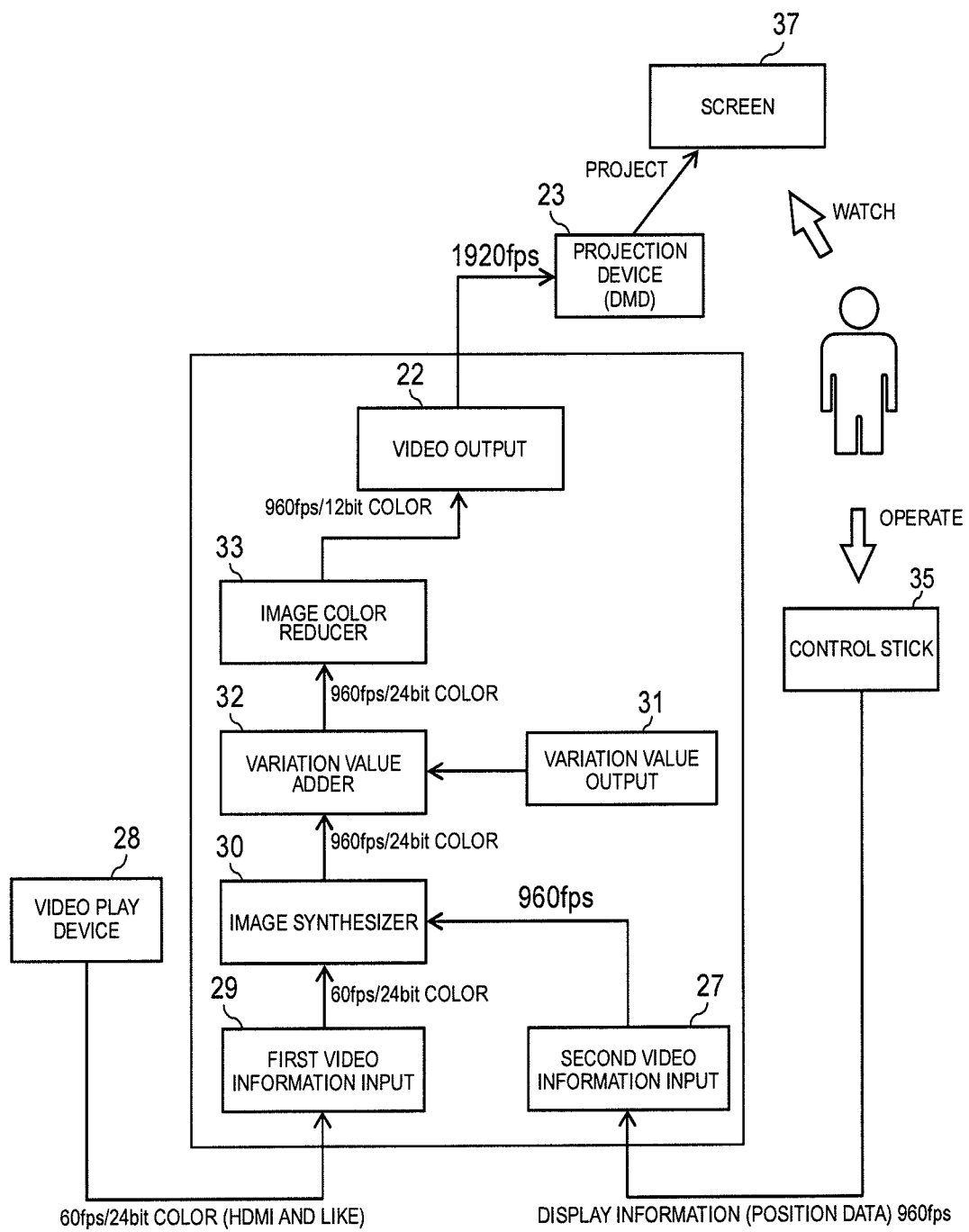
FIG. 7 is a diagram showing a third embodiment applied to a flight simulator.

FIG. 7 is a diagram showing a third embodiment applied to a flight simulator. It is to be understood that the present example has the same configuration as that of the embodiment shown in FIG. 3, and such portions may be denoted by the same reference numerals and the description thereof may be omitted. In this case, when the operator displaces the control member such as control stick 35, the external landscape changing accordingly is supplied to second video information input 27 and synthesized with the fixed video supplied to first video information input 29, and the two images are synthesized and projected on screen 37. In this manner, it is possible to display substantially 24-bit color video at a high frame rate using a limited configuration. As a result, even if there is a drastic change in the external landscape, it is possible to display video of a high gradation that does not cause a sense of discomfort.

Figure 8:
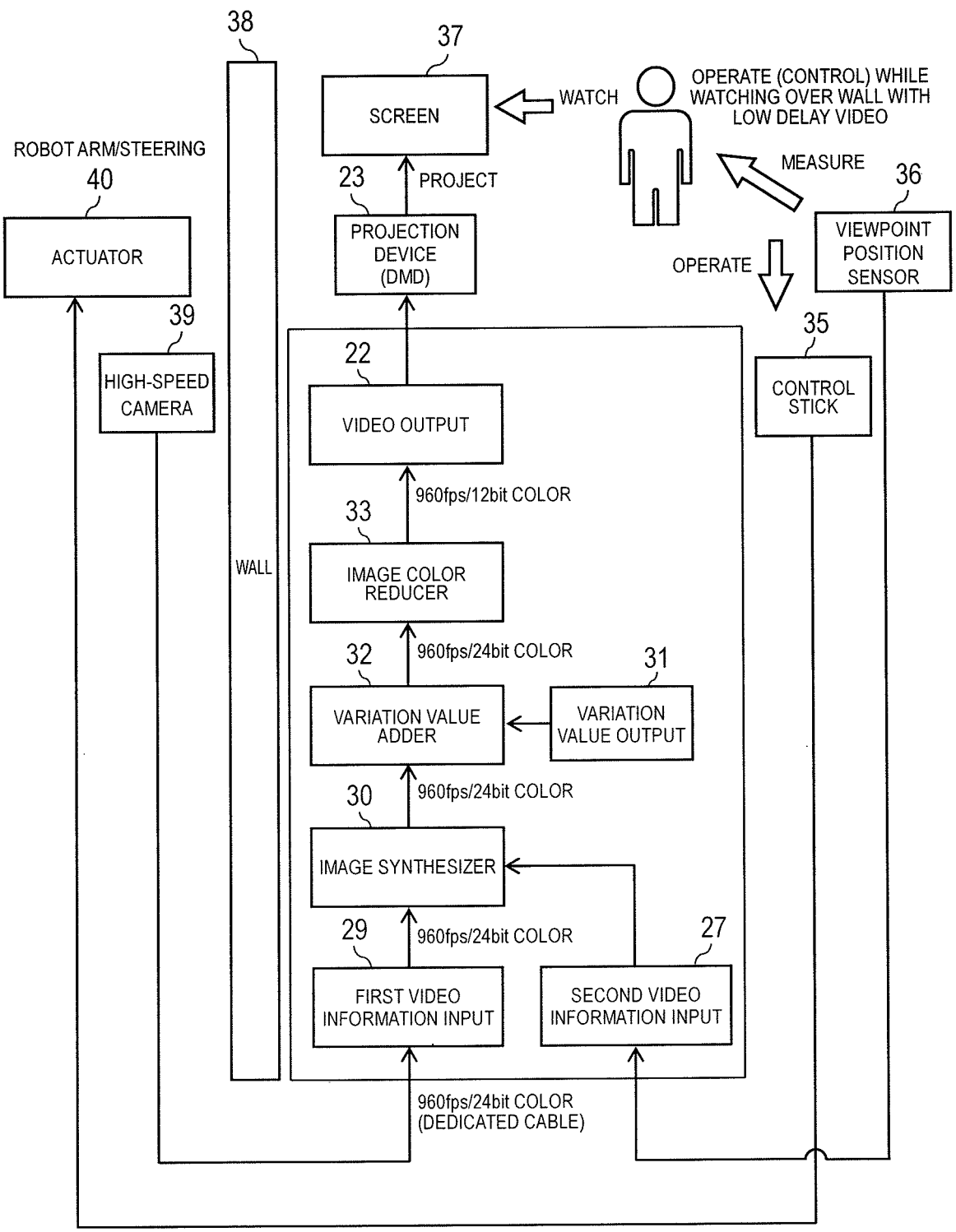
FIG. 8 is a diagram showing a fourth embodiment applied to a remote control device.

FIG. 8 is a diagram showing a fourth embodiment applied to a remote control device. It is to be understood that the present example has the same configuration as that of the embodiment shown in FIG. 3, and such portions may be denoted by the same reference numerals and the description thereof may be omitted. In this case, high-speed camera 39 for an operator to monitor the object placed in an environment isolated by an operator by wall 38 or the like, control stick 35 for operating actuator 40 for handling the object, or an operation member such as a joystick or the like is provided. On the operator side, viewpoint position sensor 36 is provided. High-speed camera 39 may acquire a three-dimensional moving image of an object, for example, by taking an object from a plurality of directions.

The position information from viewpoint position sensor 36 is supplied to second video information input 27 and synthesized with the video of the object supplied to first video information input 29. As a result, the operator may observe the object from different directions by changing the viewing direction. Also in this case, even in a case where the object moves irregularly at a high speed, it is possible to display video of a high gradation that does not cause a sense of discomfort to the operator.

Figure 9:
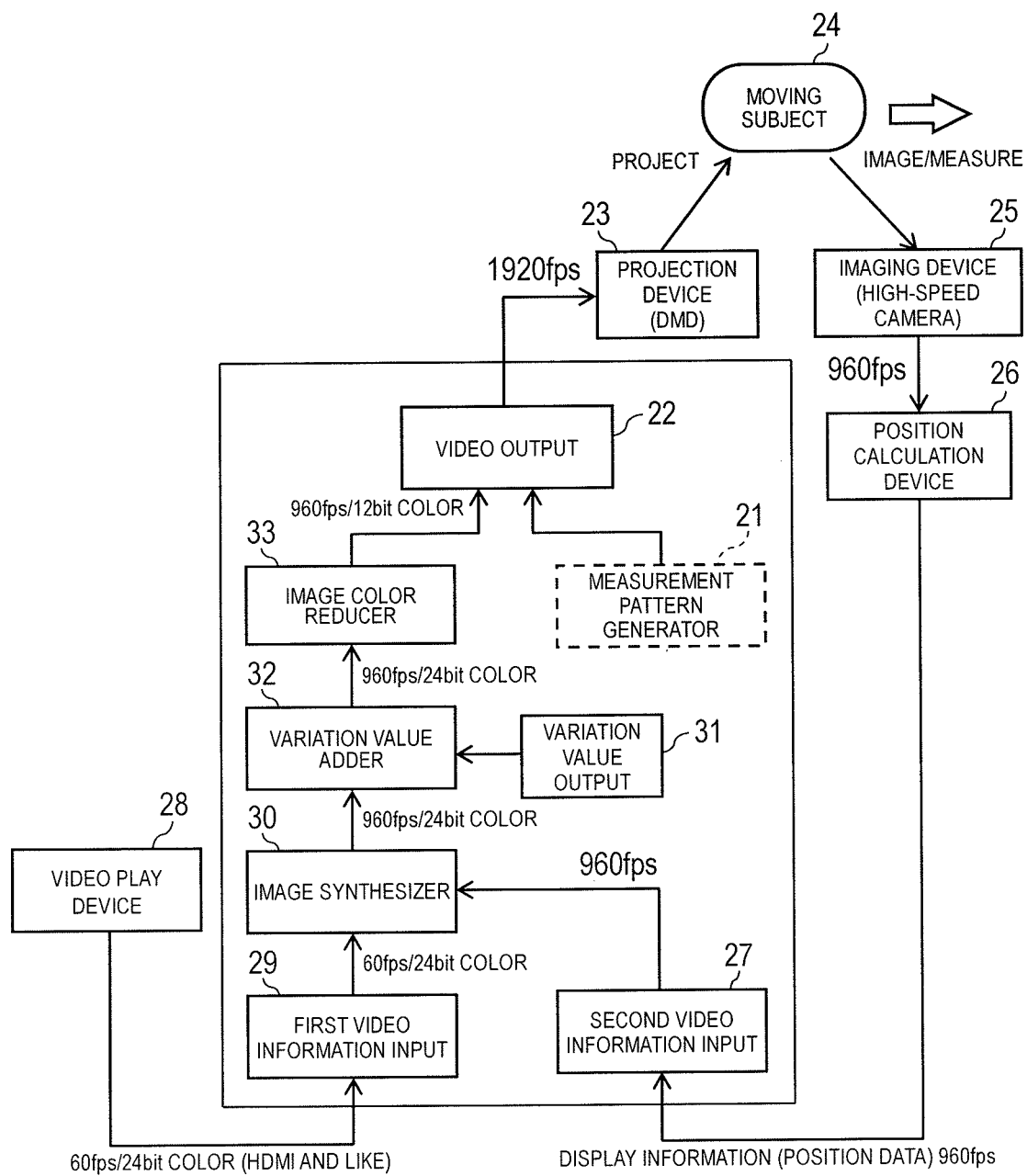
FIG. 9 is a diagram showing a modification example of the embodiment shown in FIG. 3.

FIG. 9 is a diagram showing a modification example of the embodiment shown in FIG. 3. It is to be understood that the real time measurement-projection device shown in FIG. 9 has the same configuration as that of the embodiment shown in FIG. 3, and such portions may be denoted by the same reference numerals and the description thereof may be omitted. The present example is different from the example shown in FIG. 3 in that the position data from second video information input 27 is applied to the video data output from variation value adder 32 in image synthesizer 30, and the other configuration of the example is the same as the example shown in FIG. 3.

Figure 10:
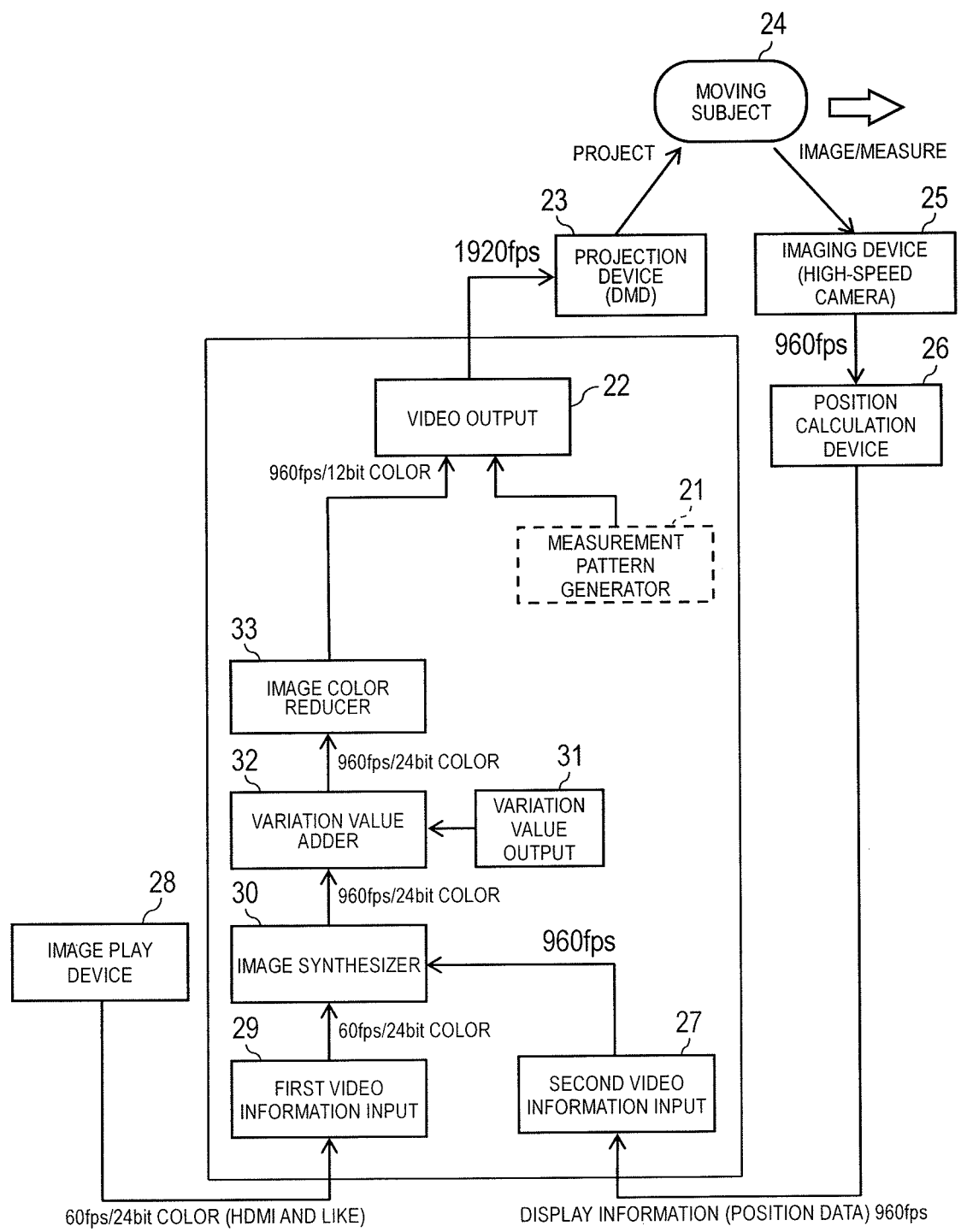
FIG. 10 is a diagram showing another modification example of a first embodiment shown in FIG. 3.

FIG. 10 is a diagram showing another modification example of the embodiment shown in FIG. 3. It is to be understood that the real time measurement-projection device shown in FIG. 10 has the same configuration as that of the embodiment shown in FIG. 3, and such portions may be denoted by the same reference numerals and the description thereof may be omitted. The present example is different from the example shown in FIG. 3 in that the position data from second video information input 27 is applied to the video data output from image color reducer 33 in image synthesizer 30, and the other configuration of the example is the same as the example shown in FIG. 3.

Figure 11:
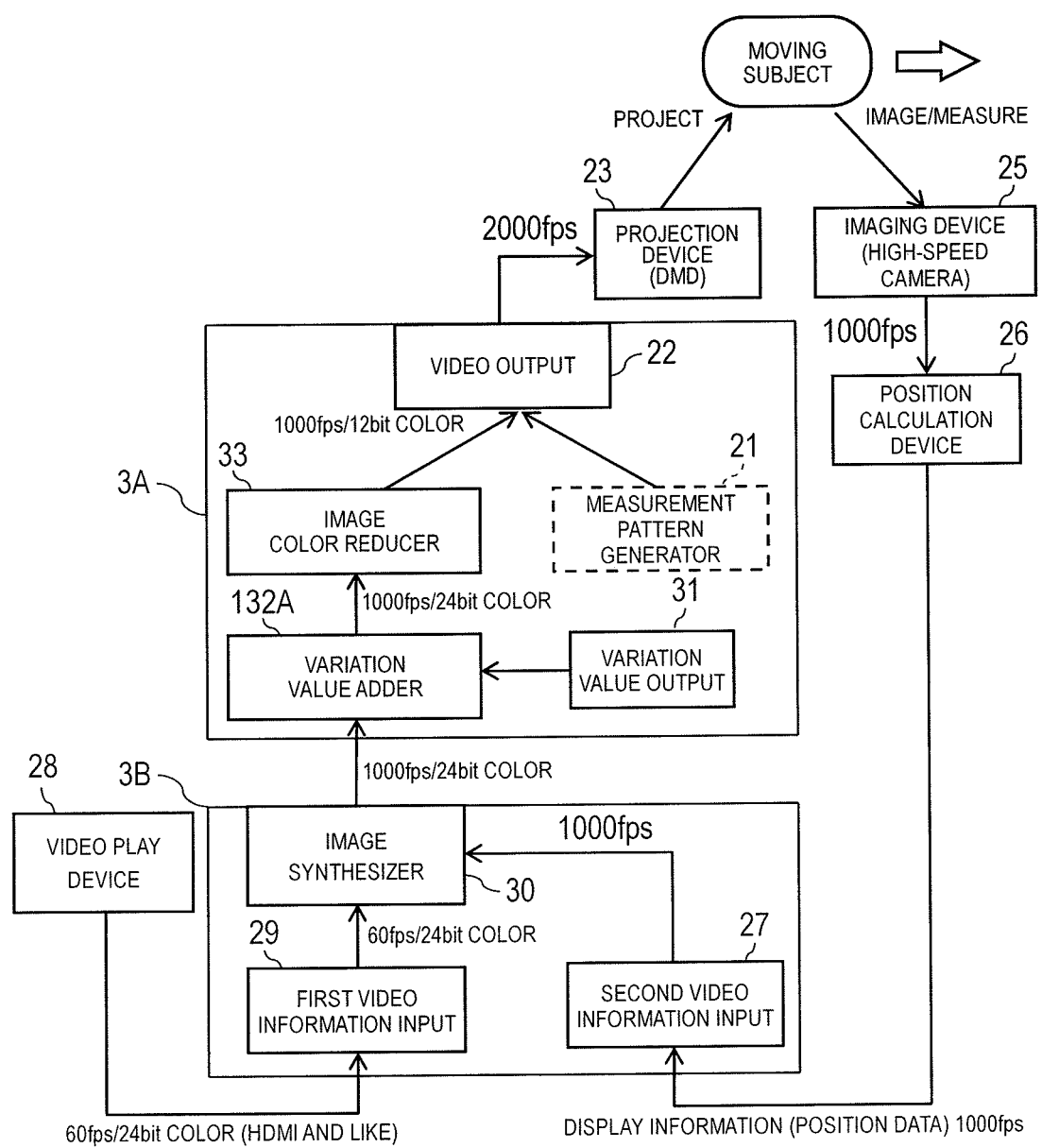
FIG. 11 is a diagram showing another modification example of the embodiment shown in FIG. 3.

FIG. 11 is a diagram showing another modification example of the embodiment shown in FIG. 3. In the system shown in FIG. 3, since it is usually difficult to input a high frame rate video from the outside, the problem is solved by having image synthesizer 30 in the device. However, if an interface that may input video of a sufficient frame rate from the outside is included, as shown in FIG. 11, even display device 3A including only variation value output 31, variation value adder 132A, and image color reducer 33 has an effect alone. In this case, image synthesizing device 3B including first video information input 29 that inputs video output from video play device 28 at 60 fps/24 bit color, second video information input 27 that inputs display information (position data) from position calculation device 26 at 1000 fps, and image synthesizer 30 that synthesizes these two pieces of video information and outputs the information at 1000 fps/24 bit color, is provided before display device 3A. The video information output from image synthesizer 30 of image synthesizing device 3B is input to variation value adder 132A of display device 3A. Variation value adder 132A adds the variation value output from variation value output 31 to the video information input from image synthesizing device 3B. The adding of the variation value itself is the same as that explained in FIGS. 1 to 10. Image synthesizing device 3B may be constituted by, for example, a personal computer (PC). For example, PCI Express (registered trademark) is used as a transmission path from image synthesizer 30 to display device 3A and a transmission path from display device 3A to projection device 23. The reason why the transmission rate of the display information (position data) from position calculation device 26 is 1000 fps and the video information output from the image synthesizer 30 is 1000 fps/24-bit color is that it is possible to improve the image quality while maintaining compatibility in the future by once establishing the interface with the information which a human being wants to visualize. In addition, the reason why the transmission rate from video output 22 of display device 3A to projection device 23 is 2000 fps is that the physical rate is doubled because an infrared pattern for measuring with the camera is inserted. The video may be at 1000 fps, and in a case where the measurement pattern is unnecessary and only video is projected at a high speed, the video may be at 1000 fps.

Figure 12:
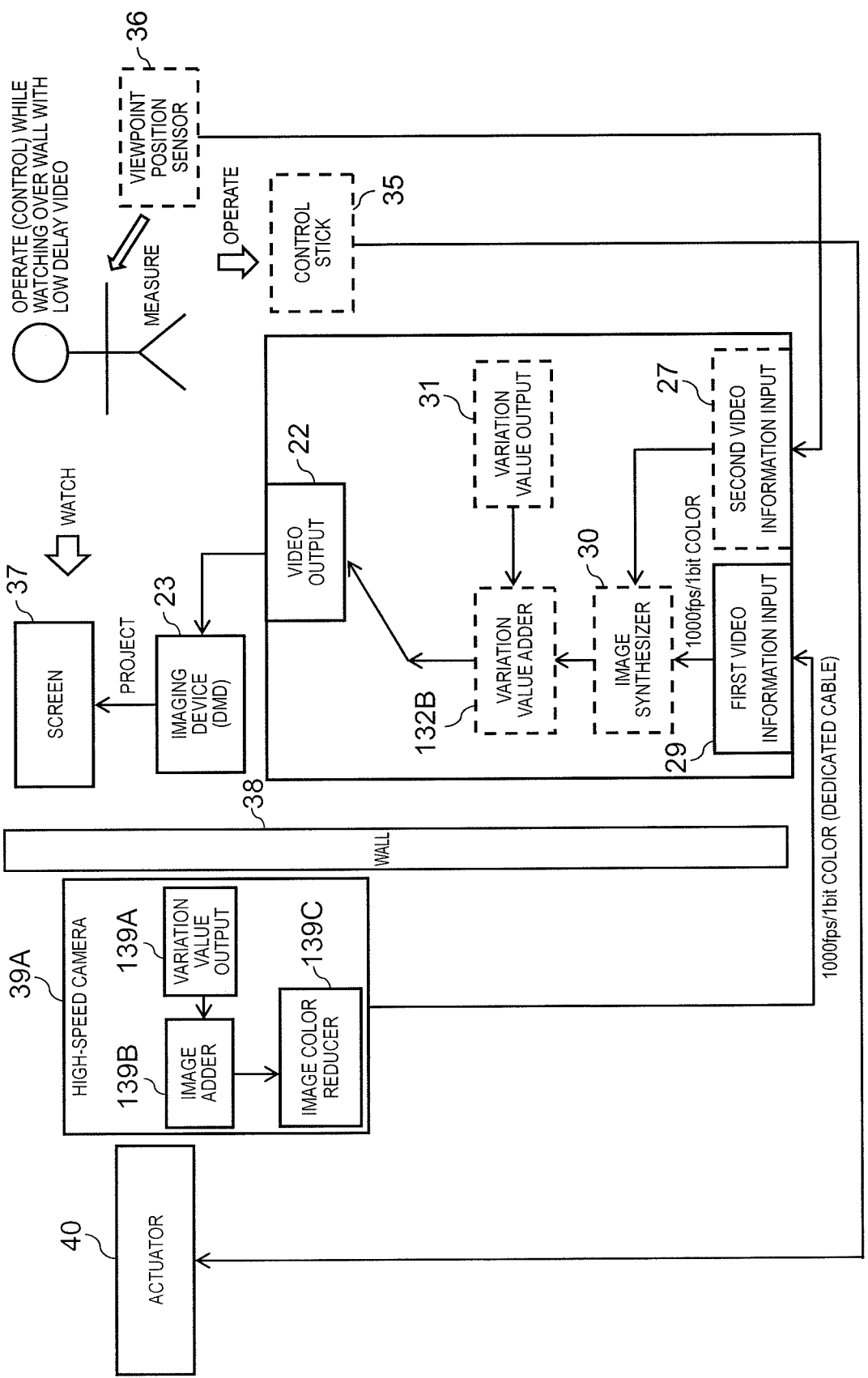
FIG. 12 is a diagram showing another modification example of the embodiment shown in FIG. 8.

FIG. 12 is a diagram showing another modification example of the embodiment shown in FIG. 8. In the device of FIG. 12, variation value adder 132B may be provided in place of variation value adder 32 and image color reducer 33 provided in FIG. 8. The video information output from high-speed camera 39A is input to variation value adder 132B via first video information input 29 and image synthesizer 30 in the device. Variation value adder 132B adds the variation value output from variation value output 31 to the video information input after each video information from first video information input 29 and second video information input 27 are synthesized in image synthesizer 30. The adding of the variation value itself is the same as that explained in FIGS. 1 to 10. However, in FIG. 12, variation value adder 132B, viewpoint position sensor 36, second video information input 27, first video information input 29, image synthesizer 30 and variation value output 31 are not always indispensable. High-speed camera 39A of FIG. 12 is slightly different from the high-speed camera of FIG. 8 and includes variation value output 139A, image adder 139B that adds the variation value output from variation value output 139A to the video information imaged by high-speed camera 39A, and image color reducer 139C. Image adder 139B adds the variation value output from variation value output 31 to the video information input from image synthesizing device 3B. The adding of the variation value itself is the same as that explained in FIGS. 1 to 10.

The variation gradation value in FIG. 8 may also be replaced with a random number having a similar probability distribution. In addition, the variation gradation value may also be replaced by adding noise at the stage of the analog signal before the video signal is digitized.

In a CG moving image and the like, video is digital from the beginning, but a moving image and the like taken by the image sensor have an analog quantity at the beginning in the image sensor. Therefore, it is possible to apply analog noise before digitizing the output from the image sensor and control quantization noise upon digitization by adding variation to a quantization threshold thereof.

In particular, because dark current noise and light shot noise are included in data captured by the image sensor from the beginning, it is also possible to obtain the same effect as adding the variation gradation value by adjusting a shutter speed and an analog gain so that the dark current noise and the light shot noise have similar probability distributions and are adjusted to a necessary amount of noise.

In addition, when combined with a high-speed camera having a function of controlling the amount of noise on the side of the image sensor as described above, it is possible to construct a system suitable for transferring the video of a high gradation with low delay. In this case, variation value adder 32 and image color reducer 33 are implemented on the image sensor side, and the gradation value to be transmitted may be reduced to 1 bit with a minimum.

Although the present invention has been described with reference to the specific embodiment, the present invention is not limited to the above-described embodiment and may be widely modified.

REFERENCE MARKS IN THE DRAWINGS

1 REAL TIME MEASUREMENT-PROJECTION DEVICE
2 PROJECTION TARGET
3 PROJECTION DEVICE
4a VISIBLE LIGHT LED LIGHT SOURCE
4b INFRARED LED LIGHT SOURCE
5 DICHROIC MIRROR
6 DIGITAL MICROMIRROR DEVICE (DMD)
7 LENS OPTICAL SYSTEM
8 COMPUTING DEVICE
9 CAMERA
10 VISIBLE LIGHT CUT FILTER
21 MEASUREMENT PATTERN GENERATOR
22 VIDEO OUTPUT
23 PROJECTION DEVICE
24 OBJECT
25 IMAGING DEVICE
26 POSITION CALCULATION DEVICE
27 SECOND VIDEO INFORMATION INPUT
28 VIDEO PLAY DEVICE
29 FIRST VIDEO INFORMATION INPUT
30 IMAGE SYNTHESIZER
31 VARIATION VALUE OUTPUT
32 VARIATION VALUE ADDER
33 IMAGE REDUCER
35 CONTROL STICK
36 VIEWPOINT POSITION SENSOR
37 SCREEN
38 WALL
39 HIGH-SPEED CAMERA

The invention claimed is:

1. A high-speed display device comprising:
   a video information input that inputs first video information expressed by original gradation values having a first number of bits at a first frame rate;
   a variation gradation value output that generates a set including M variation gradation values having a second number of bits smaller than the first number of bits corresponding to the respective original gradation values;
   a video information output that generates second video information having a second frame rate equal to M times the first frame rate by distributing the respective variation gradation values included in the set of the M variation gradation values to M frames; and
   a display that displays video based on the second video information,
   wherein M is an integer of 2 or more, and
   a sum of the M variation gradation values and the original gradation values of the first number of bits have a correlation in each set of the variation gradation values.

2. The high-speed display device of claim 1,
   wherein the second video information is generated by distributing the respective variation gradation values included in the set of the M variation gradation values to the M frames in such an order that a number of times of increase/decrease between the variation gradation values in each set of the variation gradation values is maximum.

3. The high-speed display device of claim 1,
   wherein the variation gradation value output includes
   a variation value output that outputs a variation value N having any value from 0 to M−1 corresponding to a (N+1)th variation gradation value when generating the set of the M variation gradation values corresponding to the respective original gradation values, and
   an image color reducer that generates the (N+1)th variation gradation value by dividing a sum of an original gradation value and the variation value N by a number of the M variation gradation values constituting the set of the M variation gradation values corresponding to the variation value N and truncating decimals of an obtained quotient.

4. A high-speed display method comprising:
inputting first video information expressed by original gradation values having a first number of bits at a first frame rate;
generating a set including M variation gradation values having a second number of bits smaller than the first number of bits corresponding to the respective original gradation values;
generating second video information having a second frame rate equal to M times the first frame rate by distributing the respective variation gradation values included in the set of the M variation gradation values to M frames; and
displaying video based on the second video information,
wherein M is an integer of 2 or more, and
a sum of the M variation gradation values and the original gradation values of the first number of bits have a correlation in each set of the variation gradation values.

5. The high-speed display method of claim 4,
wherein the second video information is generated by distributing the respective variation gradation values included in the set of the M variation gradation values to the M frames in such an order that a number of times of increase/decrease between the variation gradation values in each set of the variation gradation values is maximum.

6. The high-speed display method of claim 4,
wherein outputting a variation gradation value includes
outputting a variation value N having any value from 0 to M−1 corresponding to a (N+1)th variation gradation value when generating the set of M variation gradation values corresponding to the respective original gradation values, and
generating the (N+1)th variation gradation value by dividing a sum of an original gradation value and the variation value N by a number of the M variation gradation values constituting the set of the M variation gradation values corresponding to the variation value N and truncating decimals of an obtained quotient.

7. A real time measurement-projection device comprising:
a video information input that inputs first video information expressed by original gradation values having a first number of bits at a first frame rate;
a variation gradation value output that generates a set including M variation gradation values having a second number of bits smaller than the first number of bits corresponding to the respective original gradation values;
a video information processor that generates second video information having a second frame rate equal to M times the first frame rate by distributing the respective variation gradation values included in the set of the M variation gradation values to M frames;
a measurement pattern generator that generates a measurement pattern;
a video output that alternately outputs the second video information and the measurement pattern;
a projection device that projects an output of the video output onto a projection target;
an imaging device that takes video of the measurement pattern projected onto the projection target; and
a position calculation device for correcting the second video information based on a position of the projection target obtained by comparing the video of the measurement pattern obtained by the imaging device with an original measurement pattern,
wherein M is an integer of 2 or more, and
a sum of the M number of variation gradation values and the original gradation values of the first number of bits have a correlation in each set of the variation gradation values.

8. The real time measurement-projection device of claim 7,
wherein both an imaging time of the measurement pattern by the imaging device and a projection time of the second video information are shorter than a time when the imaging device reads the video of the measurement pattern and transfers the video to the position calculation device, and the video of the measurement pattern taken by the imaging device is started prior to completion of projection of preceding second video information.

* * * * *